United States Patent [19]

Hartmetz, II

[11] Patent Number: 4,495,676
[45] Date of Patent: Jan. 29, 1985

[54] APPARATUS FOR ELECTRICALLY STIMULATING AN ANIMAL CARCASS

[76] Inventor: Gerald J. Hartmetz, II, Harneds, Inc., 616 Pennsylvania, Wichita, Kans. 67202

[21] Appl. No.: 404,370

[22] Filed: Aug. 2, 1982

[51] Int. Cl.$^3$ ................................................ A22C 9/00
[52] U.S. Cl. .......................................... 17/25; 17/1 E
[58] Field of Search ...................................... 17/1 E, 25

[56] References Cited

U.S. PATENT DOCUMENTS

| 2,544,724 | 3/1951 | Rentschler | 17/25 X |
| 4,221,021 | 9/1980 | Swilley | 17/25 X |
| 4,358,872 | 11/1982 | Van Zandt | 17/1 E X |

OTHER PUBLICATIONS

WO81/01641 PCT published application, Gardell et al., Jun. 25, 1981.

Primary Examiner—Willie G. Abercrombie
Attorney, Agent, or Firm—John H. Widdowson

[57] ABSTRACT

An apparatus for electrically stimulating an animal carcass including means applying a series of electrical impulses to the animal carcass having a potential between about 30 and 60 volts and relaxing the muscles of the carcass for a period by interrupting the electrical impulses. The apparatus has a nose clamp and an insert plug. An electrical impulse generator generates low voltage electrical impulses to the nose clamp and insert plug. A step-down transformer reduces the voltage. An interval cycle timer controls the time duration of the stimulation cycle. A repeat cycle pulsation timer automatically controls the on-off of the electric current to the carcass.

1 Claim, 5 Drawing Figures

APPARATUS FOR ELECTRICALLY STIMULATING AN ANIMAL CARCASS

BACKGROUND OF THE INVENTION

1. Field of the Invention

This invention is related to a beef carcass stimulator apparatus. More specifically, this invention provides a low voltage and low amperage apparatus for stimulating beef carcass.

2. Description of Prior Art

U.S. Pat. No. 4,092,761 by McWhirter discloses electronically relaxing poultry for slaughtering. U.S. Pat. No. 4,221,021 by Swiley discloses electrical simulation of an animal carcass for the purpose of tenderizing the meat of the carcass. U.S. Pat. No. 3,711,896 by Guberman et al teaches the use of ultrasonics in tenderizing meat. None of the foregoing prior art teaches the particular low voltage and low amperage apparatus of simulating beef carcass.

SUMMARY OF THE INVENTION

This invention accomplishes its desired objects by providing an apparatus for electrically stimulating an animal carcass. The apparatus includes means for applying a series of electrical impulses to the animal carcass of a predetermined duration and having a potential of between about 30 and 60 volts; and relaxing the muscles of the carcass for a period of from between about 0.50 seconds and 3 seconds by interrupting the electrical impulses. The apparatus comprises in combination a nose clamp means and an insert plug means for respectively engaging the animal carcass in proximity to the nose and the hock of the same. An electrical impulse-generating means is positioned in a housing and is electrically connected to the nose clamp means and the insert plug means. The impulse generating means includes a step-down transformer to reduce the impact voltage from an alternating current power source to between 44 and 48 volts and the amperage to less than 1 amp. The primary winding of the step-down transformer has a primary terminal connected to the alternating power source and another primary terminal connected to a point terminal strip means. The secondary winding of the step-down transformer includes a pair of secondary terminals that connect to the point terminal strip means. An interval cycle timer means electrically attaches to the terminal strip means for controlling the time duration of the stimulation cycle. A repeat cycle pulsation timer means electrically connect to the terminal strip means for automatically controlling the on-off of the electric current to the carcass.

It is an object of the invention to provide a novel apparatus for electrically stimulating an animal carcass to tenderize the same.

Still further objects of the invention reside in the provision of an apparatus for electrically stimulating an animal carcass which operates at low voltage and amerpage.

These together with the various ancillary objects and features will become apparent as the following description proceeds, are attained by this invention, preferred embodiments being shown in the accompanying drawings, by way of example only, wherein:

DETAILED DESCRIPTION OF THE INVENTION

Figure 5:
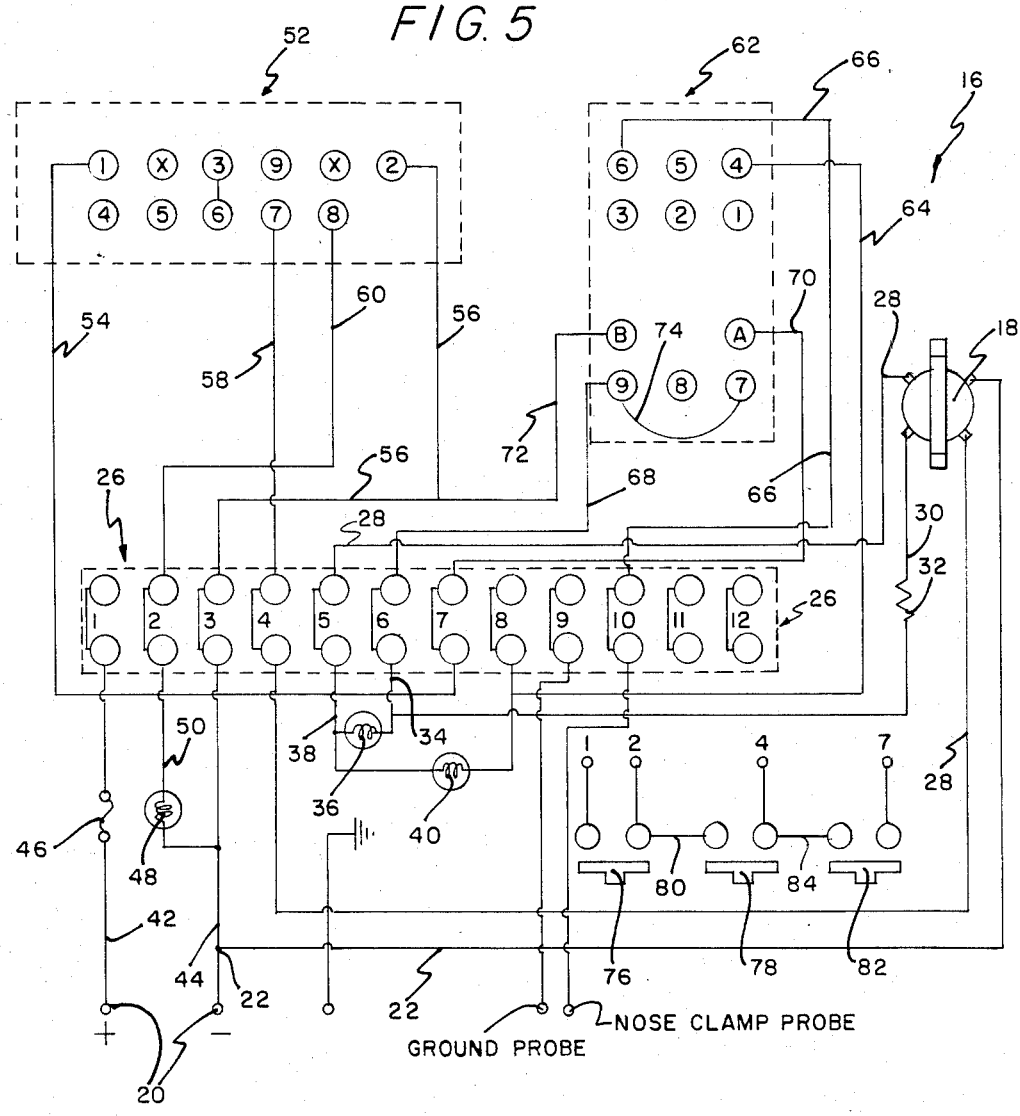
FIG. 5 is a schematic view of the circuitry employed in this invention.

Referring in detail now to the drawings, wherein similar parts of the invention are identified by like reference numerals, there is seen the apparatus generally illustrated as 10, for electrically stimulating an animal carcass 12, comprising a housing 14, and an electrical impulse generating means, generally illustrated as 16 in FIG. 5. Generating means 16 comprises a step-down transformer 18 to reduce the impact voltage and amperage from an alternating current power source at 20. The primary winding of transformer 18 has terminal 22 connected to power source 20 and terminal 24 connected to point 4 at a twelve point terminal strip, generally illustrated as 26. The secondary winding of step-down transformer 18 has a terminal 28 connected to point 5 on strip 26 and terminal 30, having resistor 32, attaching to conductor 34 which includes lamp 36. Conductor 34 connects from conductor 38, which interconnects points 5 and 8 on terminal strip 26, to point 6 of strip 26. Lamp 40 attaches within conductor 38. Power source 20 has conductors 42 and 44 respectively leading to points 1 and 3 of terminal strip 26. Fuse 46 is electrically in conductor 42. Lamp 48 interconnects from point 2 of strip 26 to conductor 44 by means of conductor 50.

Interval cycle timer means, generally illustrated as 52, has terminals 1 through 9 wherein respectively from terminal 1, 2, 7 and 8 conductors respectively 54, 56, 58 and 60 attach to points 7, 3, 4 and 2 of point terminal strip 26. Repeat cycle pulsation timer means, generally illustrated as 62, has terminals 1 through 9 and A and B wherein respectively from terminals 6, 9 and A conductors respectively 66, 68 and 70 attach to points 10, 6, and 7 of point terminal strip 26. Conductors 64 and 72 extend from terminals 4 and 8 respectively of pulsation timer means 62 to conductors 38 and 56 respectively. Conductor 74 interconnects points 7 and 7 of pulsation timer means 62. Switch means 76 electrically connects to points 1 and 2 of point terminal strip 26. Switch means 78 attaches to switch means 76 by conductor 80 and to point 4 of point terminal strip 26. Switch means 82 electrically connects to switch means 78 via conductor 84 and to point 7 terminal strip 26.

Figure 1:
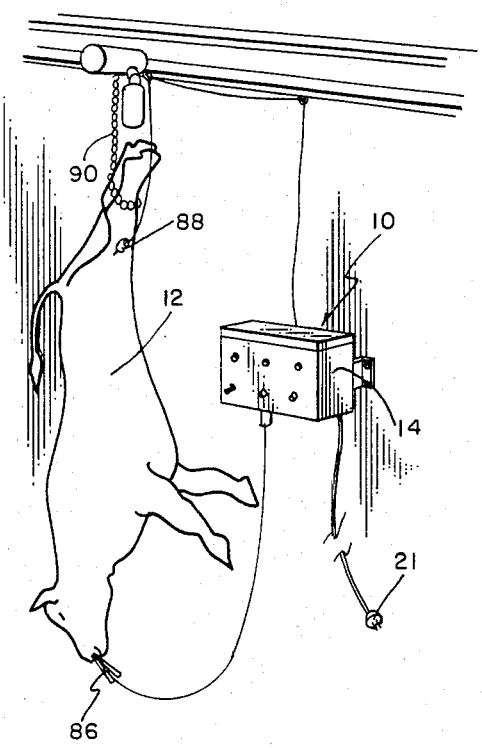
FIG. 1 is a perspective view of the invention connected to a beef carcass.
Figure 2:
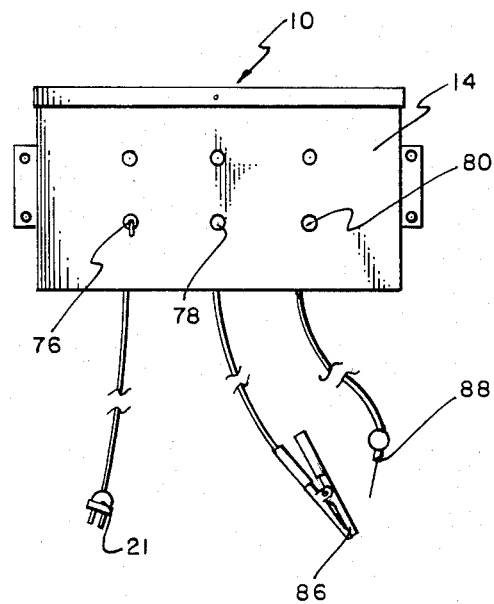
FIG. 2 is a front elevational view of the invention.
Figure 3:
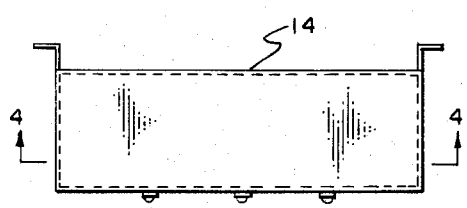
FIG. 3 is a top view of the invention.
Figure 4:
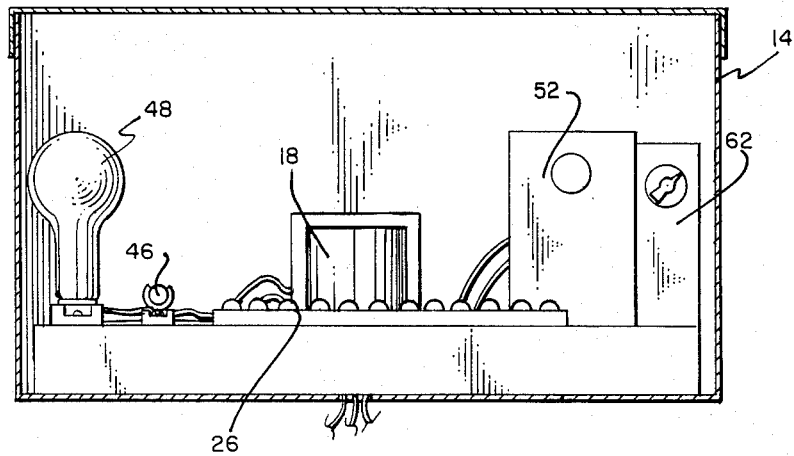
FIG. 4 is a vertical sectional view taken along the plane of line 4—4 and in direction of the arrows in FIG. 3.

The apparatus 10 also includes a nose clamp hot probe means 86 connecting from point 10 of the point terminal strip 26 to the nose or lip of the carcass 12. Ground probe means 88 attaches from point 9 of the point terminal strip 26 to into a hock of the carcass as illustrated in FIG. 1. Shackle 90 is for shackling the hind hocks of the carcass 12.

The apparatus 10 operates by inserting plug 21 into a 120 volt, single phase, 60 cycle, AC current power source 20. The interval cycle timer means 52 and pulsation timer means 62 are functionally known and available (especially the wiring) to those skilled in the art and are for controlling the time duration of the stimulation cycle, and for automatically controlling the on-off of the electric current to the carcass 12, respectively. Preferably, the time duration of the duration cycle is from 0 to 150 seconds. More preferably, the duration cycle is from 60 to 120 seconds; most preferably, it is 90 seconds. In a preferred embodiment of the invention the pulsation range of pulsation timer means 62 is from 0.5 to 4 seconds. More preferably the range is from 1 to 2 seconds; most preferably it is a 1 second pulsation rate. Fuse 46 is preferably 1 amp. Lamp 48 is preferably 25 watt, 115 volts. Lamps 36 and 40 are both 53 MA, 48 volts. Transformer 18 is preferably 115 volts-50/60 Hertz primary and reduces the input primary voltage and amps. to between 35 to 50 volts and 0 to 1 amps. respectively. More preferably the transformer 18 steps-down the voltage and amperage to between 40 and 50 volts and 0.3 to 0.6 amps., respectively. Most preferably, the secondary windings of transformer 18 reads about 46 volts and between about 0.4 to 0.5 amps. Resistor 32 is preferably 100 Ohm, 5 watt to insure the transformer 18 output is limited to about 48 volts at about 120 volts input. Switch 76 is preferably of the type: SPOT, Maintained contact, push on-push off, about 6 amps. at about 120 volts AC. Switches 78 and 82 are both preferably of the type: SPST, momentary contact, normally open, push on about 0.5 amps. at about 120 volts AC.

With continuing reference to the drawings for operation of the invention, both hocks of the carcass 12 are shackled with shackle 90. Ground probe 88 is inserted into a hock of the carcass 12. Clamp is connected to the nose of the same. Switch 76 is closed which lights lamp 48 and establishes a path for 120-125 volts via conductor 80 to switch 78. Subsequently closing switch 78 establishes a path for 120-125 volts through conductor 84 to switch 82 and energizes transformer 18 which steps-down the voltage and amperage to most preferably, as was previously indicated, about 46 volts and 0.5 amps. Lamp 36 lights up indicating that low voltage (46 volts) and amperage (0.5 amps.) is available to energize the muscles of the animal carcass 12 through clamp 86 and probe 88 with electrical impulses of, most preferably, 1 sec. at a 46 volt potential and 1 amp.

Closing switch 82 starts internal cycle timer means 52 and repeat cycle pulsation timer means 62 simultaneously, establishing a holding circuit through internal contacts in timer means 52 at which time switch 78 is released. Timer 52 runs for a predetermined interval which, as has been previously indicated, may be 0 to 150 seconds, but is most preferred to be about 90 seconds, depending to the weight and age of the carcass. During this period, pulsation timer 62 provides preset equal on-off intervals (0.5 to 4 seconds) of low volts (46 volts), low amp (0.5 amps.) to light lamp 40 an energize the nose clamp 86 to apply to series of electrical impulses to the animal carcass 12. Equal on-off intervals of most preferably 1 second interrupts the 1 second electrical impulses for 1 second to allow the muscles of the carcass 12 to relax for about 1 second. This stimulation continues until timer 52 runs its course, or until switch 82 is released, at which time interval cycle timer 52 resets to zero and the apparatus 10 is off.

I have discovered that may invention is most effective with beef. It also works with sheep, goats and hogs. It may be even applied to horses, buffalo, etc. My low voltage (about 46 volts), low amps. (about 0.5 amps.) improves tenderness of the meat over the prior art high volts (over 700 volts) and amperage process and apparatuses. It reduces cold shortening (heat ring and sour); improves color and visibility of marbling; carcass 12 bleeds easier; easier skinning means cleaner carcass 12;

and it allows for easier boning (a must for hot boning) and reduces holding time.

Most important, my invention is safer than the prior art because of the low voltage and amperage. A good ground connector with ground probe 88 is critical to the operation of the invention. Almost every problem encountered in any stimulation unit can be traced to a poor ground connection. To eleminate this problem, I have equipped my apparatus 10 with a positive ground probe 88. The lead (as shown in FIG. 1) to the probe 88 should run up the wall and over to the hoist-shackle 90. If my invention is operated properly, it would be literally impossible to be electrocuted because of the low volts and amps., while improving tenderization over the prior art units.

While the present invention has been described herein with reference to particular embodiments thereof, a latitude of modification, various changes and substitutions are intended in the foregoing disclosure, and it will be appreciated that in some instances some features of the invention will be employed without a corresponding use of other feature without departing from the scope of the invention as set forth.

I claim:

1. An apparatus for electrically stimulating an animal carcass to tenderize the same comprising in combination a nose clamp means and an insert plug means for respectively engaging the animal carcass in proximity to the nose and the hock of the same, a housing, an electrical impulse-generating means positioned in said housing and electrically connected to said nose clamp means and said insert plug means, said impulse-generating means including a step-down transformer to reduce the input voltage from an alternating current power source to between 44 and 48 volts and the amperage to less than about 1 amps., said step-down transformer has a primary winding including one primary terminal connected to the alternating power source and another primary terminal connected to a point terminal strip means, the secondary winding of said step-down transformer includes a pair of secondary terminals that connect to said point terminal strip means, an interval cycle timer means electrically attached to said terminal connected to the alternating power source, and a repeat cycle pulsation timer means electrically connected to said terminal strip means for automatically controlling the on-off of the electric current to the carcass, said interval cycle timer means includes four interval terminals electrically engaged to said terminal strip means, and said repeat cycle pulsation timer means comprises five pulsation terminals electrically engaged to said terminal strip means, one of said interval terminals and one of said pulsation terminals connect to a common terminal on said terminal strip means; a resistor means engaging a secondary terminal, a first low voltage lamp means electrically engaging the secondary terminal having the resistor means to indicate when low voltage is available for stimulation, a second low voltage lamp means electrically engaged to the first low voltage lamp means and the point terminal strip means; a first switch means electrically engaging the terminal strip means; a second switch means electrically engaged to the first switch means and to the terminal strip means which when closed energizes step-down transformer and lights up the first low voltage lamp means; and a third switch means electrically engaged to the second switch means and the terminal strip means which closed starts said interval timer means and said repeat cycle timer means.

* * * * *